Nov. 16, 1948.    D. C. ROWE    2,454,257
ARRESTING HOOK

Filed Oct. 4, 1934    2 Sheets-Sheet 1

INVENTOR.
DONALD C. ROWE.
BY
ATTORNEYS

Nov. 16, 1948.  D. C. ROWE  2,454,257
ARRESTING HOOK
Filed Oct. 4, 1934  2 Sheets-Sheet 2
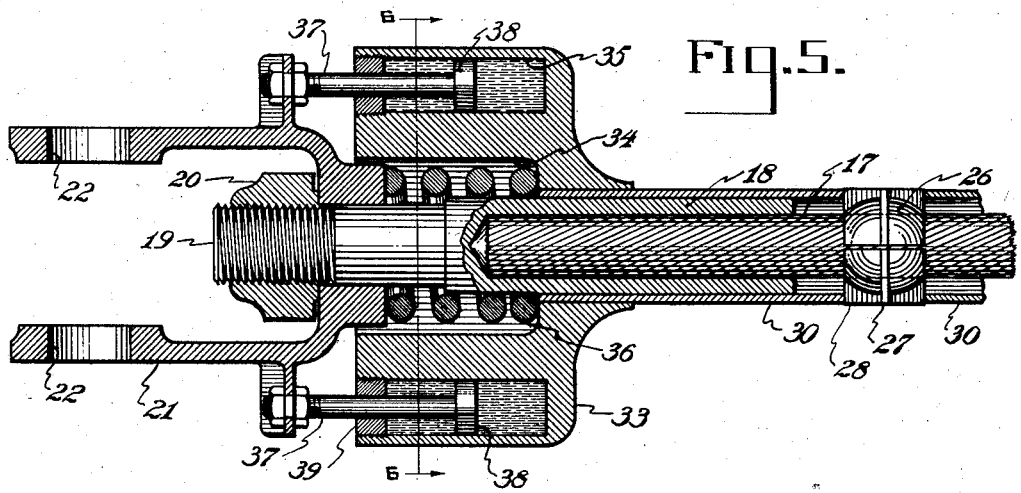
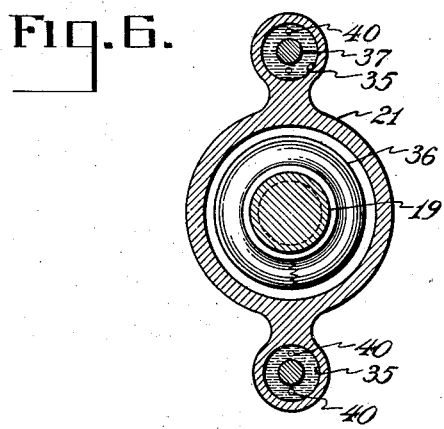
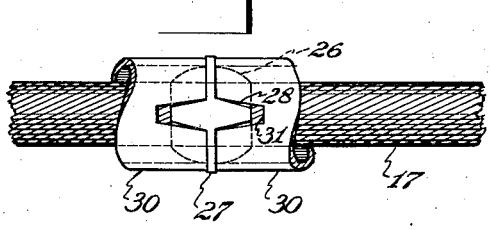
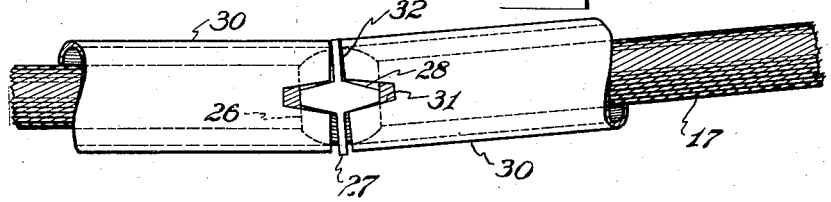
INVENTOR.
DONALD C. ROWE.
BY
ATTORNEYS.

Patented Nov. 16, 1948

2,454,257

UNITED STATES PATENT OFFICE 2,454,257

ARRESTING HOOK

Donald C. Rowe, Kenmore, N. Y., assignor, by mesne assignments, to Curtiss-Wright Corporation, a corporation of Delaware Application October 4, 1934, Serial No. 746,762

11 Claims. (Cl. 244—110)

This invention relates to aircraft, and is particularly, concerned with improvements in landing mechanisms therefor.

Certain types of aircraft are designed for the purpose of taking off from and landing on limited landing areas—this is true particularly of aircraft operating from the decks of ships commonly known as aircraft carriers. Aircraft of this character are equipped with an arresting gear generally comprising a rod or the like, provided at its lower end with a hook, the rod and hook being connected with the aircraft so that when preparing to land, the hook may be lowered below the aircraft body. Upon approaching the landing surface, the hook scrapes along the surface and engages suitable transverse ropes or the like, by which the movement of the plane is quickly arrested.

An object of this invention is to improve the construction of the aircraft arresting gear so that said arresting gear will not bounce when it hits the landing surface.

A further object is to so construct an aircraft arresting gear that regardless of the speed or attitude in which the aircraft is landed, the arresting hook will continue to engage the landing surface to insure engagement of the hook with one of the above mentioned transverse ropes.

A further object is to provide an articulated aircraft arresting gear provided with shock absorbing mechanism and resilient means, the former tending to prevent bouncing of the arresting gear and the latter tending to hold the arresting gear in its proper attitude for landing.

Further objects will be apparent as the specification proceeds, and for a clearer understanding, reference may be made to the drawings, in which similar numbers indicate similar parts, and in which:

Fig. 5 is an axial section through the upper portion of the arresting gear;

Fig. 6 is a section on the line 6—6 of Fig. 5;

Fig. 7 is a side elevation, partly broken away, showing a portion of the arresting gear; and Fig. 8 is a view similar to Fig. 7, showing a portion of the arresting gear in a deformed state.

Figure 1:
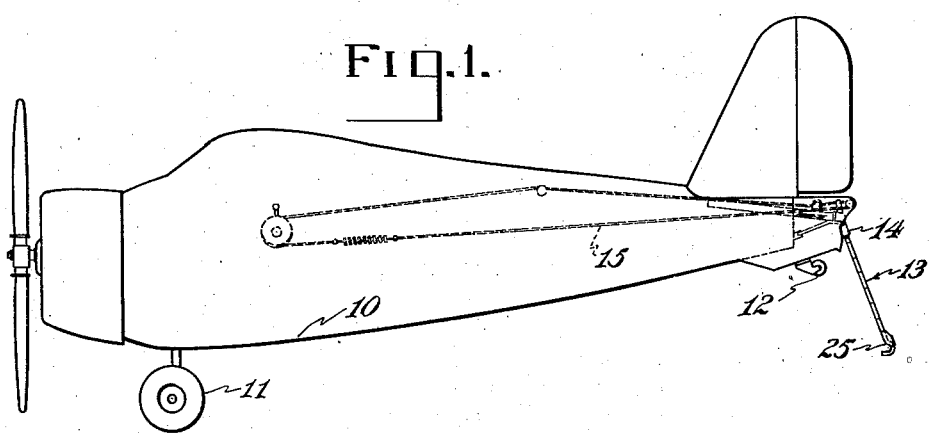
Fig. 1 is a side elevation of an aircraft equipped with the arresting gear of this invention.
Figure 2:
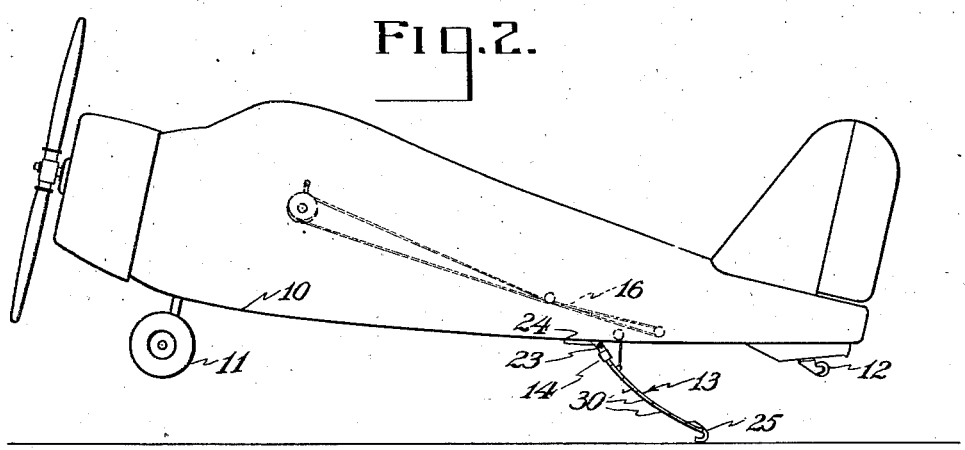
Fig. 2 is a side elevation of an aircraft in the landing attitude, showing the arresting gear of this invention in contact with a landing surface.

In Figs. 1 and 2, an aircraft fuselage 10 having a forward landing gear 11 and a tail wheel 12 is provided with an arresting gear 13 hinged at its upper end 14 to a portion of the aircraft. Fig. 1 shows the arresting gear 13 applied rearward of the tail wheel, cable means 15 being provided to retract the gear 13 wholly within the tail portion of the fuselage. In Fig. 2, the gear 13 is hinged intermediate the fuselage and adjacent its lower surface, cable means 16 being provided to move the gear 13 between a retracted position adjacent the lower fuselage surface and an extended position below the fuselage.

The mechanism of the gear 13 is more particularly shown in Figs. 4 to 8, the gear comprising a cable 17 of a type which is resistant to twisting. Such cables are well known in the art and usually comprise alternate layers of wire wound in opposite directions. This cable 17 is rigidly mounted in a socket 18 by well known means, the socket being provided with a threaded shank 19 held by a nut 20 within a yoke 21, the yoke 21 being provided with aligned openings 22 adapted to receive a mounting bolt 23 passing through a fitting 24 fixed to the aircraft. The lower end of the cable 17 has rigidly attached thereto a hook 25 organized to engage cables on the landing surface. To resiliently hold the cable 17 in a straight line attitude, a plurality of split balls 26 are spaced along the cable, these balls having a circumferential shoulder 27, and having diametrically opposed lugs 28 extending from the shoulders in an axial direction. The sides of these shoulders are tapered as at 29. A plurality of tubular sleeves 30 are slipped over the cable prior to its mounting to the aircraft, the ends of these sleeves being provided with diametrically opposed notches 31, adapted to engage over the lugs 28 of the balls 26. The ends of the sleeves 30 are normal to the sleeve axes, and are arranged to normally abut against opposite sides of the shoulders 27, as at 32. The uppermost sleeve 30, shown in Fig. 5, rigidly carries a fitting 33 having a bore 34 and a pair of cylinders 35 formed therein. A heavy spring 36 rests within the bore 34, abutting at its ends against the fitting 33 and against the yoke 21, respectively. By screwing up on the nut 20, the cable is pulled toward the yoke 21, pressing the several sleeves 30 against the several shoulders 27, to hold the assembly in a straight line attitude. If, however, the hook 25 sharply strikes a landing surface, the sleeves are moved out of line with respect to each other, one point on the end of each sleeve serving as an instantaneous center on which the sleeve may articulate, the balance of the end portion of each sleeve moving away from the shoulder 27 with which it is normally in engagement. Such articulation of the sleeves obviously tends to compress the spring 36, said spring constantly urging all of the sleeves toward full abutment with the shoulders 27 to hold the gear in a straight line attitude. The balls 26 serve to hold the sleeves concentric with the cable, and the lugs 28 and notches 31 tend to prevent the sleeves and the cable from twisting. It will be noted that the tapered conformation of the lugs 28 and the notches 31 permit of relative movement of the sleeves with respect to the balls.

A non-reactive damping device is provided for the spring 36 in the form of plungers 37 carried by the yoke 21, having pistons 38 slidably engaging the cylinders 35 formed in the fitting 33. The plungers 37 are sealed by means of a plug 39 engaging the cylinder ends, and the pistons 38 are further provided with orifices 40 through which fluid may pass upon relative movement of the fitting 33 and the yoke 21.

Figure 3:
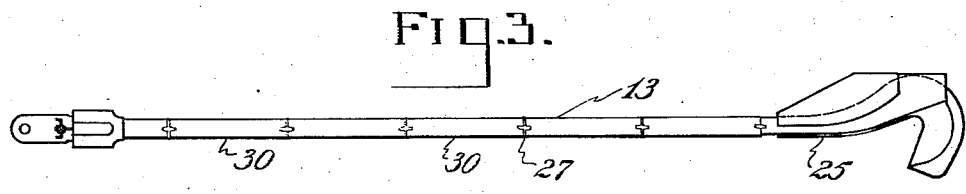
Fig. 3 is a side elevation of the arresting gear per se.
Figure 4:
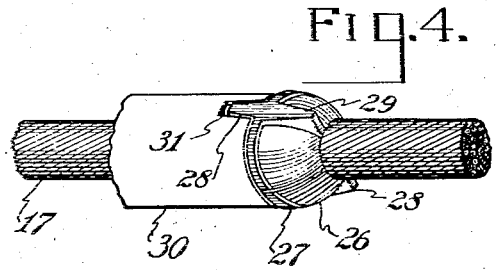
Fig. 4 is a perspective view of a portion of the arresting gear.

In operation, the aircraft may approach the landing surface, as in Fig. 2, the gear 13 having previously been lowered to the landing position. As the hook strikes the landing surface, the shock of striking causes the sleeves 30 to articulate, bending the gear 13 out of the aligned position shown in Figs. 1 or 3. This bending of the gear causes compression of the spring 36, and if the shock of striking of the hook 25 is sufficient, would cause the hook 25 to bounce off the landing surface. The dashpots formed by the pistons 38 and the cylinders 35, however, prevent fast movement of the spring 36, and damp any bouncing tendency which might be present. Thereby, the spring 36 resiliently holds the hook 25 in engagement with the landing surface. Should any slight bouncing occur, the spring 36 immediately tends to urge the hook 25 toward contact with the landing surface, and the dashpots above mentioned tend to prevent a repetition of violent striking of the hook whereby, upon a possible second contact of the hook with the landing surface, no further bouncing can occur.

As the process of landing proceeds, the arresting gear 13 may either pivot about the bolt 23, or the gear 13 may articulate as the landing gear 11 and 12 may contact with the landing surface. Thereafter, the transverse rope which has been engaged by the hook 25 is released, and the arresting gear 13 is retracted by means of the cable organizations 15 or 16 shown in Figs 1 and 2.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. An arresting gear for aircraft comprising a tension element attached at one end to said aircraft and having a hook at its other end, articulated means encasing said element, and resilient means connecting said articulated means with said aircraft for normally urging said tension element and articulated means toward a predetermined attitude.

2. An arresting gear for aircraft comprising a flexible tension element having an arresting hook, and articulated means embracing said element and a resilient device for normally holding said element and means in a predetermined attitude.

3. An arresting gear for aircraft comprising a tension element flexible throughout its length organized to normally assume a straight line attitude and capable of being curvably deformed in a vertical plane only, means secured to said element for tensioning same, and means secured to said element for damping the movement of said element between straight line and curved attitudes.

4. A non-bouncing arresting gear for aircraft comprising a flexible non-twisting element carrying a hook, a plurality of sleeves arranged end to end over said element, abutments carried by said element against each of which adjacent sleeve ends are adapted to abut, and resilient means urging said sleeves toward contact with said abutments for normally holding said sleeves and element in straight alignment, and a non-reactive dashpot for damping the movement of said resilient means when said sleeves and element are unaligned.

5. In an arresting gear for aircraft, a non-twisting cable fixed to said aircraft and carrying a hook at its outer end, a plurality of circumferentially shouldered split balls spaced along and encircling said cable, a plurality of rigid sleeves encircling said cable and bearing at their ends on said shoulders, and resilient means acting on one said sleeve for urging said sleeves and split balls toward said hook.

6. An arresting gear for aicrcraft comprising a yoke carried by said aircraft, a flexible cable extending therefrom, a member embracing said cable and translatable relative thereto, resilient means acting between said yoke and member for urging said member away from said yoke, a ground contact element at the remote end of said cable, and a plurality of sleeves in end-to-end abutment embracing said cables, the end sleeves abutting respectively against said member and said ground contact element.

7. An arresting gear for aircraft comprising a yoke carried by said aircraft, a flexible cable extending therefrom, a member embracing said cable and translatable relative thereto, resilient means acting between said yoke and member for urging said member away from said yoke, a ground contact element at the remote end of said cable, a plurality of sleeves in end-to-end abutment embracing said cables, the end sleeves abutting respectively against said member and said ground contact element, and dashpot means for non-reactively damping movement between said cable-embracing member and said yoke.

8. An arresting gear for aircraft comprising a flexible cable attached to said aircraft carrying a hook at its outer end, a plurality of sleeves encircling said cable in end-to-end abutment with each other, the outer end sleeve abutting against said hooks, and a reactive shock absorber between the inner end sleeve and the aircraft urging said sleeves toward firm abutment against each other for normally maintaining said cable in a straight line attitude.

9. In an arresting gear for aircraft, a member flexible throughout its length depending from the aircraft and having a hooked element carried thereby for engagement with the landing surface, whereby bouncing tendencies of the gear are reduced due to deformation within the length of said flexible member, and means coextensive with said flexible member organized to hold the flexable member resiliently in a straight line attitude.

10. In arresting gear for aircraft, a flexible member having a hook rigidly connected to one end and having means at its other end for connection to said aircraft, and means operatively connected to said flexible member for damping bouncing movements of said hook, said damping means being operative in response to bending of said flexible member.

11. In arresting gear for aircraft, a multi-part flexible member having a hook rigidly connected to one end and having means at its other end for connection to said aircraft, said flexible member comprising a plurality of parts disposed in end-to-end relation, and a spring operatively connected to said member for urging said parts to a predetermined attitude relative to each other.

DONALD C. ROWE.

REFERENCES CITED

The following references are of record in the file of this patent:

UNITED STATES PATENTS

| Number | Name | Date |
|---|---|---|
| 1,398,393 | Riley | Nov. 29, 1921 |
| 1,488,572 | Vroom | Apr. 1, 1924 |
| 1,499,472 | Pratt | July 1, 1924 |
| 1,515,577 | Gentzcke | Nov. 11, 1924 |
| 1,647,619 | Hall | Nov. 1, 1927 |
| 1,724,188 | Garris | Aug. 13, 1929 |
| 1,791,497 | Gwinn | Feb. 10, 1931 |
| 1,893,591 | Minshall | Jan. 10, 1933 |
| 1,908,408 | Cox | May 9, 1933 |